United States Patent [19]
McIntosh

[11] 4,024,378
[45] May 17, 1977

[54] ELECTRIC HEATING SYSTEM CIRCUIT FOR SEQUENTIALLY ENERGIZING A PLURALITY OF HEATING ELEMENTS

[75] Inventor: Harold A. McIntosh, Los Angeles, Calif.

[73] Assignee: Robertshaw Controls Company, Richmond, Va.

[22] Filed: May 1, 1975

[21] Appl. No.: 573,703

[52] U.S. Cl. .............................. 219/486; 219/321; 219/364; 219/493; 219/511; 236/1 E; 307/41; 337/102

[51] Int. Cl.² ..................... H05B 1/02; F24H 3/04; H02J 3/14

[58] Field of Search .......... 219/364, 376, 320, 321, 219/480, 482, 483, 484, 486, 487, 490, 491–493, 508, 511; 307/38, 39, 41, 141.8; 236/1 E; 337/377, 340, 102, 44, 51

[56] References Cited
UNITED STATES PATENTS

| | | | |
|---|---|---|---|
| 2,958,755 | 11/1960 | Miller | 219/486 X |
| 3,046,380 | 7/1962 | Carlson | 219/486 X |
| 3,353,000 | 11/1967 | Tomlinson | 219/321 |
| 3,586,822 | 6/1971 | Pastore | 219/321 X |
| 3,588,471 | 6/1971 | Chambers | 219/486 |
| 3,606,970 | 9/1971 | Kompelien | 219/364 UX |
| 3,659,155 | 4/1972 | Chambers | 219/476 X |
| 3,770,977 | 11/1973 | McIntosh | 307/41 |
| 3,912,906 | 10/1975 | McIntosh et al. | 219/486 |

Primary Examiner—A. Bartis
Attorney, Agent, or Firm—O'Brien & Marks

[57] ABSTRACT

An electrical circuit for a heating system has a plurality of electrical resistance heating elements and a blower all controlled by a plurality of electro-thermally actuated relays. The circuit is arranged so that the heating elements are sequentially energized and de-energized and so that the blower is maintained in operation at all times that any one of the heating elements is energized. A thermostat controls the operation of the relays, the second and the last of which each having switches connected in series circuits with the actuator of the first relay and in parallel with the thermostat so as to maintain blower operation, which is controlled by the first relay, when the thermostat opens.

7 Claims, 5 Drawing Figures

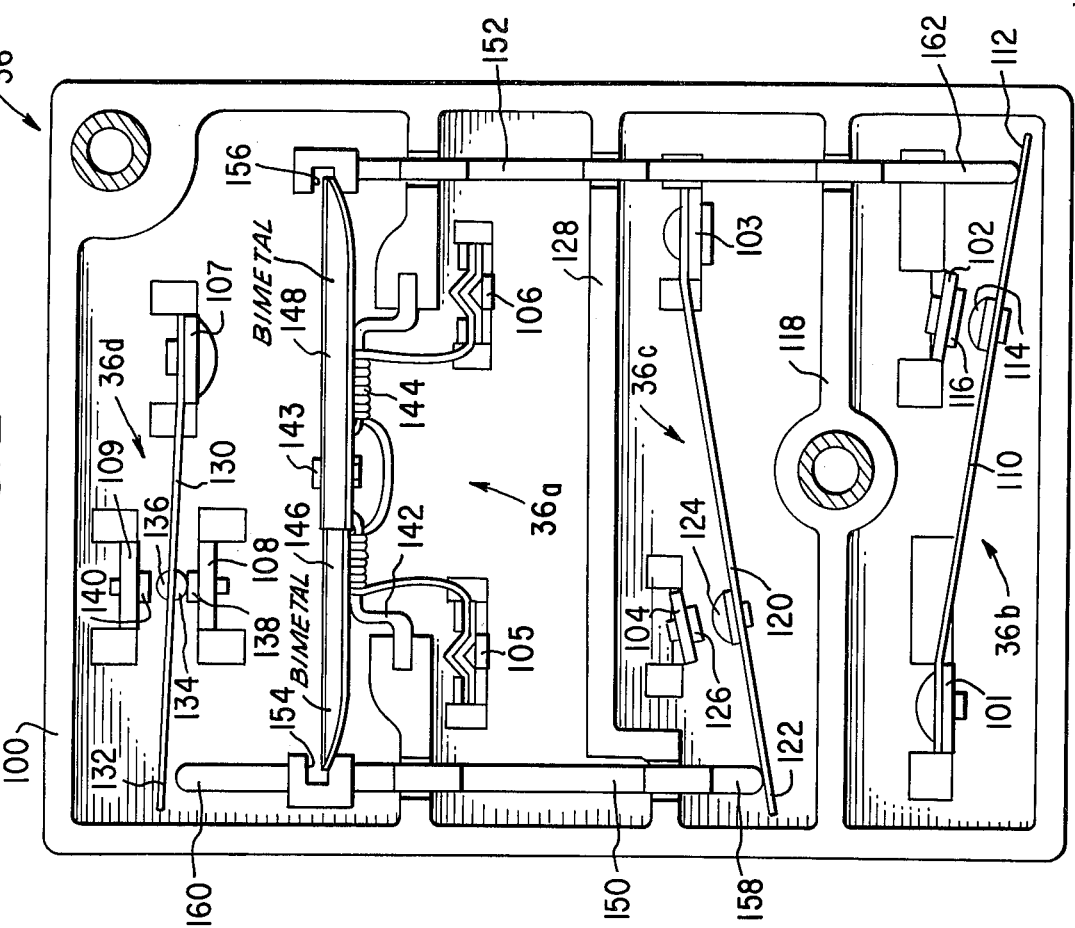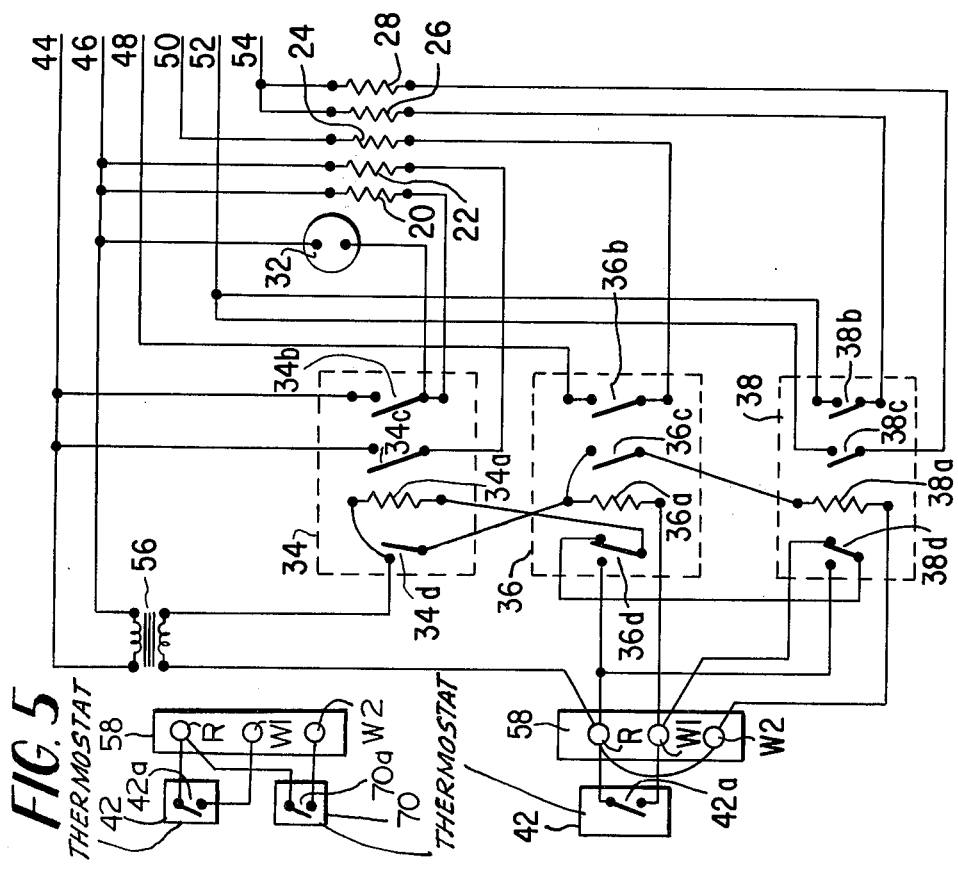

ELECTRIC HEATING SYSTEM CIRCUIT FOR SEQUENTIALLY ENERGIZING A PLURALITY OF HEATING ELEMENTS

BACKGROUND OF THE INVENTION

1. Field of the Invention

The invention relates to electrical circuits for electric heating systems and, in particular, to systems in which a plurality of heating elements are sequentially energized by cascaded delay relays to avoid power line surges and in which a blower is maintained in operation by the circuit at all times during the sequential operation of the heating elements.

2. Description of the Prior Art

The prior art, as exemplified by U.S. Pat. Nos. 3,046,380; 3,242,978; 3,351,739; 3,588,471; 3,659,155 and 3,770,977 contains many circuits for sequential operation of electric heater elements wherein blower operation is maintained at all times when one or more electric heating elements are energized. In prior art circuits using three of more cascade energized delay relays for sequentially energizing a plurality of heating elements wherein a first of the relays controls blower motor operation, it has been necessary to utilize separate facilities, such as a heat sensor or an element current sensor, to maintain the first relay operated after the opening of a thermostatic switch to continue blower operation whenever any heating element is energized.

SUMMARY OF THE INVENTION

The invention is summarized in that a circuit for a heating system includes a plurality of electric heating elements; means including a motor for circulating fluid to be heated; a plurality of at least three relays each having a heat motor and at least two switches which are closeable by energizing the respective heat motor for at least a predetermined time duration; a first switch of a first relay of the plurality of relays controlling the motor of the fluid circulating means; a first switch on each of the relays following the first relay controlling the respective heating elements; a second switch of each relay, except a last relay of the plurality of relays, controlling the energization of the heat motor of the next relay; a thermostatic switch connected in a first series circuit with the heat motor of the first relay to energize the first relay to commence heating of the heating elements; and a second switch of the last relay connected in a second series circuit with the heat motor of the first relay to maintain the first relay energized when the last relay in energized.

An object of this invention is to allow sequential energization and de-energization of a plurality of heating elements by cascade energized delay relays while maintaining blower operation without the need for any temperature or current sensor to insure blower operation.

A further object of the invention is to construct a heating system utilizing three or more delay relays with insured blower operation employing significantly less parts than was previously possible.

It is also an object of the invention to construct a heating system having multiple heating elements while still assuring blower operation while any heating element is energized.

Other objects and advantages of this invention will become apparent from the following description taken in conjunction with the accompanying drawings.

BRIEF DESCRIPTION OF THE DRAWINGS

FIG. 1 is a diagram of an electrical circuit for a heating system in accordance with the invention.

FIG. 2 is an elevation view of the interior of an electrical sequencer or relay in the circuit of FIG. 1.

FIG. 5 is a diagram of a modification of FIGS. 1 or 4.

DESCRIPTION OF THE PREFERRED EMBODIMENTS

Figure 3:
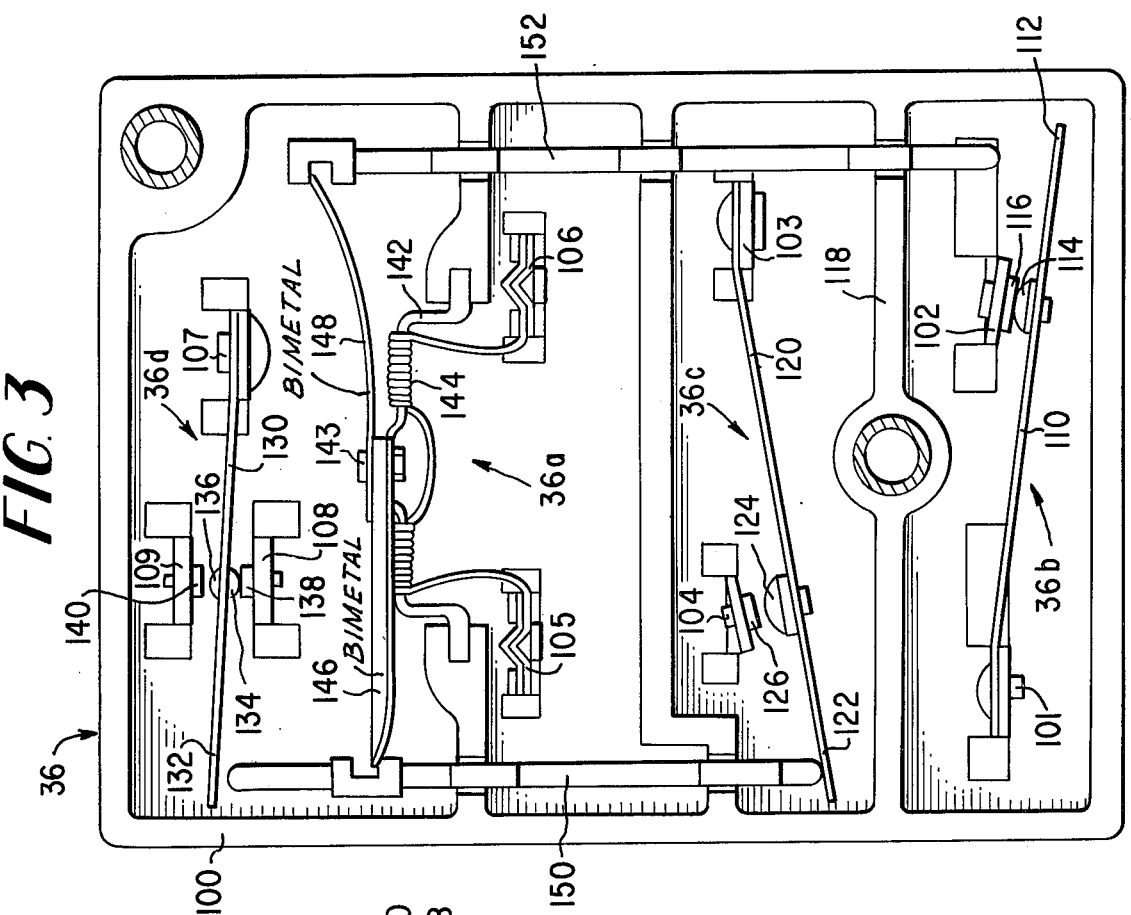
FIG. 3 is an elevation view of the relay of FIG. 2 in a first high temperature state.

As illustrated in FIG. 1, the invention is embodied in an electrical heating system including five heating elements 20, 22, 24, 26 and 28 and a blower motor 32, all controlled by sequentially operating relays 34, 36 and 38, activated by a thermostatic switch 42 which is located in an area to be heated. The heater elements 22, 24, 26 and 28 are conventional resistance heating elements mounted in a suitable heat exchange chamber (not shown) through which a fluid flow is circulated by motor driven means, such as air directed by a blower (not shown) powered by the blower motor 32. Construction of suitable heat exchange chambers, resistive heating elements, blowers, and thermostats are well known in the art and are not described in detail here.

As shown in FIG. 2, the relay 36 has a rigid, insulative housing 100 through which nine electrical connection terminals 101, 102, 103, 104, 105, 106, 107, 108, 109 extend. The relay 36 includes a heat motor 36a, two single pole single throw switches 36b and 36c, and one single pole double throw switch 36d. A flexible resilient contact arm 110 of switch 36b is secured at one end to terminal 101, is free at another end 112, and has a contact 114 urged by the contact arm 110 to make contact with a contact 116 on terminal 102. A flexible resilient contact arm 120 of switch 36c is secured at one end to terminal 103, is free at another end 122 and has a contact 124 urged by the contact arm 120 into contact with a contact 126 on terminal 104. Portions 118 and 128 of housing 100 separate switches 36b and 36c from each other and the rest of the relay. A flexible resilient contact arm 130 forming a common contact of switch 36d is secured at one end to terminal 107, is free at another end 132, and has contacts 134 and 136 on each side thereof aligned with contacts 138 and 140 disposed on terminals 108 and 109, respectively. Contact arm 130 urges contact 134 toward normally closed contact 138 while contact 140 is normally open.

The heat motor 36a includes an inverted U-shaped member 142 with a heater 144 wound around it. On end of the heater wire 144 is connected to terminal 105, the other end to terminal 106. Two elongated bimetal elements 146 and 148 each have one end secured to member 142 by a bolt or rivet 143 such as to be heated by the heater wire 144. The bimetal elements 146 and 148 are constructed with a transverse curvature to provide a snap action effect; upon reaching a certain predetermined temperature the transverse curvature disappears and the elements warp into a longitudinal curvature as shown by element 148 in FIG. 3, which is in its high temperature state. The predetermined temperature at which the snap action occurs is determined by the original transverse curvature of the element. Element 146 is constructed with a greater curvature than element 148 so that element 146 snaps into its high temperature state at a higher temperature than element 148.

Elongated switch actuators 150 and 152 are slidably mounted in the housing 100 transverse to the bimetal elements 146 and 148. The actuators 150 and 152 have respective transverse grooves 154 and 156 into which the free ends of the respective bimetal elements 146 and 148 extend for moving the actuators 150 and 152 when the bimetal elements change states. One end 158 of the actuator 150 extends toward the free end 122 of the contact arm 120 such that the contact 124 is held out of engagement with the contact 126 when the bimetal element 146 is in its low temperature state and the contact arm 120 is allowed to force the contact 124 into engagement with the contact 126 when the bimetal element 146 is in its high temperature state. The other end 160 of the actuator 150 extends toward the free end 132 of the contact arm 130 such as to operate the switch 36d when the bimetal element 146 changes to its high temperature state and to allow the switch 36d to return to its normal state when the bimetal element 146 changes to its low temperature state. An end 162 of the actuator 152 extends toward the free end 112 of the contact arm 110 such as to hold the contact 114 out of engagement with the contact 116 when the bimetal element 148 is in its low temperature state and to allow the contact arm 110 to force the contact 114 into engagement with the contact 116 when the bimetal element 148 is in its high temperature state.

Relay 38 of FIG. 1 is identical to relay 36 and has a heat motor 38a and switches 38b, 38c, and 38d. Heat motor 34a and switches 34b and 34c of relay 34 are substantially identical to similar components 36a, 36b, and 36c in relay 36; however, in relay 34 the switch 34d is a normally open single pole single throw switch similar in structure to switch 36d except that there is no normally closed contact in switch 34d corresponding to contact 138, FIG. 2, on terminal 108 of relay 36. All relay switches are shown in their normal or low temperature state in FIG. 1.

One side of switch 34b is connected to a power line 44 and the other side is connected in series to a parallel combination of blower motor 32 and heater element 20 to a power line 46. A suitable power source, such as 120 or 240 volts AC, is connected to power lines 44 and 46. Heater element 22 is also connected to power line 46 and is connected in series through switch 34c to power line 44. Heater element 24 is connected on one end to a power line 50 and on the other end serially through switch 36b to power line 48. One end of each of heater elements 26 and 28 is connected to a power line 54 while element 26 is connected on its other end through switch 38b to a power line 52 and element 28 is similarly connected through switch 38c to power line 52. Suitable power sources or the same power source is also connected across power lines 48 and 50 and lines 52 and 54.

Also connected across the power lines 44 and 46 is the primary winding of a step-down transformer 56 which has a secondary winding providing a low voltage, such as 24 volts, to a control circuit for the relays 34, 36 and 38. The secondary winding of the transformer 56 has one side connected to a series circuit through the heater wire of heat motor 34a, the contact arm of switch 36d, the normally closed contact of switch 36d, the contact arm of switch 38d, the normally closed contact of switch 38d, a terminal W1 of a thermostatic terminal block 58, and normally open contacts 42a of thermostatic switch 42, to a terminal R of the thermostat terminal block 58 to which the other end of the secondary of transformer 56 is connected. Another series circuit is connected through the normally open contact of switch 34d, the contact arm of switch 34d, the heater wire of heat motor 36a, the terminal W1, the normally open thermostat contacts 42a and terminal R.

Still another series circuit is connected through the normally open contact of switch 34d, the contact arm of 34d, the switch 36c, the heater wire of heat motor 38a, and a contact W2 of thermostat terminal block 42 which is connected directly to terminal R. The normally open contacts of switches 36d and 38d are both connected directly to terminal R so that when switch 36d is operated, a series circuit is completed from the secondary winding of transformer 56 through the heat motor 34a, the contact arm of switch 36d, and the normally open contact of switch 36d to the terminal R; and so that when switch 38d is operated and switch 36d is returned to its unoperated position, a series circuit is completed from the secondary of transformer 56 through the heat motor 34a, the contact arm of switch 36d, the normally closed contact of switch 36d, the contact arm of switch 38d, and the normally open contact of switch 38d to terminal R.

The operation of the circuit of FIG. 1 is controlled by the thermostat 42 which controls the operation of relays 34, 36 and 38 so as to sequentially energize heating elements 20, 22, 24, 26, and 28 and to sequentially de-energize elements 24, 28, 26, 22 and 20 while operating the blower motor 32 at any time that any one of the heating elements is energized.

The relay 36, FIG. 2, is actuated by energization of the heater wire 144 which heats the bimetal elements 146 and 148. After a first predetermined delay, bimetal element 148 snaps into its high temperature state and switch 36b, which was held open by actuator 152 now closes as shown in FIG. 3. After a second predetermined delay, bimetal element 146 changes to its high temperature state and switch 36c, previously held open by actuator 150, now closes. At the same time, actuator 150 moves contact 134 of switch 36d from engagement with normally closed contact 138 and forces contact 136 into engagement with normally open contact 140 by pressing on the free end 132 of contact arm 130 of switch 36d. Suitable first and second actuation delays, which are determined by the transverse curvature of the bimetal elements 146 and 148, are 25 and 45 seconds after energization of heater wire 144. In order to deactuate the relay, heater wire 144 is de-energized. After a first delay, element 146 snaps to its low temperature state and switch 36c opens and switch 36d returns to its original state. After a second delay, element 148 snaps back and switch 36b opens. Suitable first and second deactuation delays for the respective elements 146 and 148 are 40 and 60 seconds after de-energization of heater wire 144.

The operation of the entire circuit of FIG. 1 is commenced by the closing of thermostatic contacts 42a. This completes the circuit through heat motor 34a, contact arm and normally closed contact of switch 36d, contact arm and normally closed contact of switch 38d, terminal W1, thermostatic contacts 42a, and terminal R so as to supply energy to heat motor 34a. After a time delay, switch 34b closes and the blower motor 32 and the heating element 20 are energized. After a second time delay, switches 34c and 34d close thereby energizing heater element 22 and completing the circuit through switch 34d, heat motor 36a, terminal W1, thermostat contacts 42a, and terminal R. Heat motor 36a is thereby energized, and after a time delay, switch 36b is closed energizing heater element 24. After another delay, switch 36c closes completing the circuit through switch 34d, switch 36c, heat motor 38a and the terminals W2 and R. Simultaneous with the closure of switch 36c, switch 36d throws and completes the circuit from the transformer to heat motor 34a, through the contact arm and the normally open contact of switch 36d, directly to terminal R and back to the transformer. This keeps heat motor 34d energized as long as switch 36d is thrown. Heat motor 38a is now energized and after a delay, switch 38b closes energizing heater element 26. After a further delay, switch 38c closes energizing heater element 28 and at the same time switch 38d throws to connect its contact arm with its normally open contact. In this manner the blower motor 32 and heater elements 20, 22, 24, 26 and 28 have all been energized sequentially in response to the sensing of a low temperature by thermostat 42.

When the heat supplied to the area to be heated is sufficient thermostatic contacts 42a open and the circuit is de-energized sequentially. Specifically, the circuit through heat motor 36a is opened and it is de-energized. The opening of thermostatic contacts 42a does not de-energize heat motor 34a since the circuit through the heat motor 34a, contact arm of switch 36d and normally open contact of switch 36d remains completed. After a delay, switch 36c opens and the contact arm of switch 36d returns to its normally closed contact. The return of switch 36d to its normal state has no effect on relay 34 since heat motor 34a is now energized through the contact arm and normally closed contact of switch 36d and the contact arm and normally open contact of switch 38d to to terminal R. The opening of switch 36c de-energizes heat motor 38a. After a second delay, switch 36b opens de-energizing heater element 24. After a delay from the de-energization of heat motor 38a, switch 38c opens disconnecting heater element 28, and switch 38d returns de-energizing heat motor 34a. Then switch 38b opens removing the power from heater element 26. Shortly thereafter switches 34c and 34d open removing heater element 22 from the circuit. Finally, switch 34b opens de-energizing blower motor 32 and heater element 20. Thus, the heater elements are sequentially de-energized while maintaining the blower in operation at all times when any element is energized.

Figure 4:
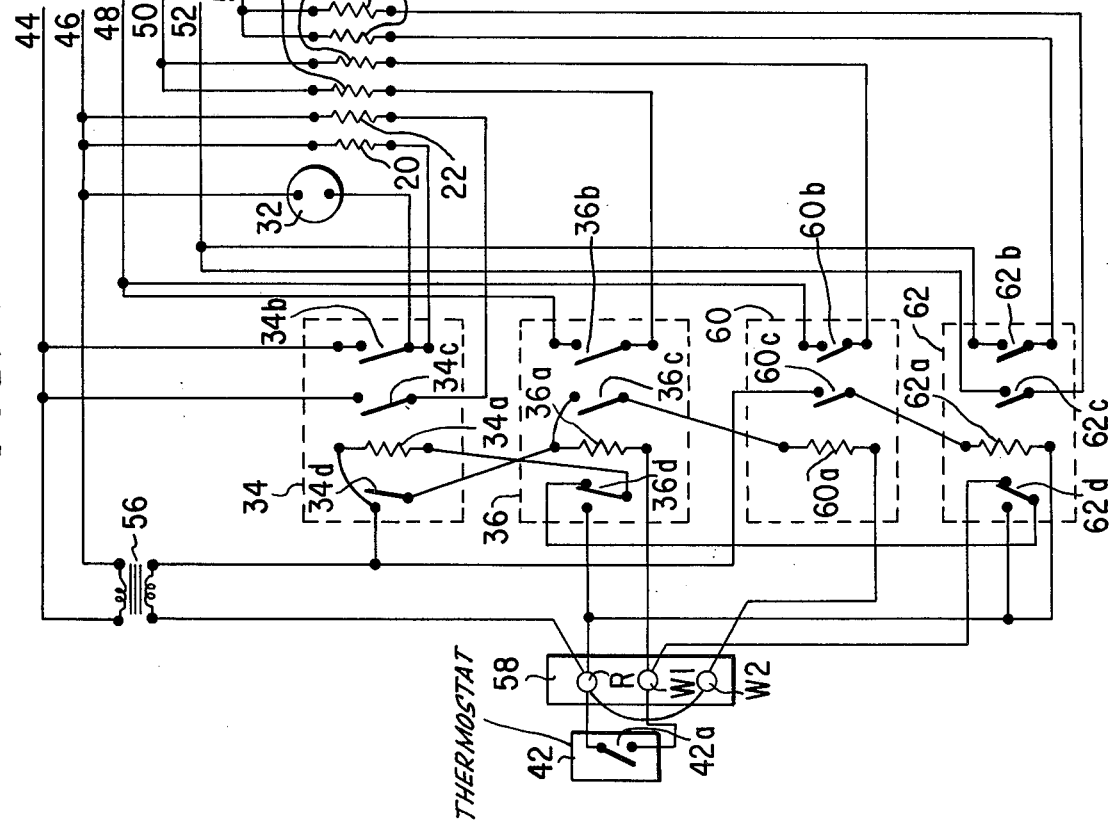
FIG. 4 is a diagram of an electrical circuit for another heating system in accordance with the invention.

A modified heating circuit is shown in FIG. 4 wherein characters used to identify parts in FIG. 1 are used to identify parts in FIG. 4 indicating that such commonly identified parts have substantially the same structure and/or function. This modified circuit has six heater elements 20, 22, 24, 26, 28 and 30, along with the blower motor 32. Relay 38 of FIG. 1 has been removed and relays 60 and 62 have been added. Relay 62 is substantially identical to relay 36, and relay 60 has heat motor 60a and switches 60b and 60c which are substantially identical to heat motor 36a and switches 36b and 36c of relay 36. Heater elements 20, 22 and 24 and blower motor 32 are connected as in FIG. 1 to switches 34b, 34c and 36b and power lines 44, 46, 48 and 50. Heater elements 26, 28 and 30 are connected serially with switches 60b, 62b and 62c, respectively, across respective power lines 48, 50, 52 and 54. The control circuit for relays 34 and 36 is the same except that switch 36c is now serially connected to heat motor 60a and the normally closed contact of switch 36d is connected to the contact arm of a switch 62d. A normally open contact of switch 60c is connected to one side of the secondary of transformer 56 while the contact arm of switch 60c connects in series through heat motor 62a to terminal R. It can be seen that switch 62d is connected identically to switch 38d of FIG. 1.

The operation of the circuit of FIG. 4 is similar to that of FIG. 1. Contacts 42a close energizing heat motor 34a to operate switch 34b energizing motor 32 and heater element 20. Then, switches 34c and 34d close thereby energizing heater element 22 and heat motor 36a. Soon switch 36b and then switches 36c and 36d close sequentially energizing heater element 24 and heat motor 60a and completing a second energizing circuit for heat motor 34a. Then switches 60b and 60c sequentially close energizing heater element 26 and supplying power to heat motor 62a. Subsequently, switch 62b closes energizing heater element 28, and finally, switches 62c and 62d close energizing heater element 30 and connecting the contact arm of switch 62d to terminal R.

The shut down sequence is initiated by the opening of contacts 42a de-energizing heat motor 36a. Switch 36c opens to de-energize heat motor 60a, and simultaneously contact arm of switch 36d disengages the normally open contact of switch 36d to open the second energizing circuit for heat motor 34a and engages the normally closed contact of switch 36d to complete a third energizing circuit for heat motor 34a through the contact arm and normally open contact of switch 62d. Then, switch 36b opens which de-energizes element 24. Switches 60b and 60c sequentially open de-energizing element 26 and heat motor 62a. Soon switches 62b and 62c open de-energizing elements 28 and 30. Simultaneously with the opening of switch 62c, switch 62d returns to its normal state and power is removed from heat motor 34a. Soon switches 34c and 34d open de-energizing element 22, and then, finally switch 34b opens de-energizing heater element 20 and the blower motor 32.

It can be readily seen that this current can be extended for any number of heater elements merely by inserting more relays in a similar cascade fashion between the second and last relays. The sequential operation would be preserved and the blower motor 32 would always remain energized until the last heater element was turned off.

It is particularly advantageous in the circuits shown in FIGS. 1 and 4 that the last relay of a series of cascade operated relays contain a switch for completing an energization circuit for the first relay controlling the blower motor. Thus, there is eliminated the necessity of providing a separate current sensor or heat sensor to maintain operation of the blower motor.

Further, it is noted that in the circuit of FIG. 1 operation of the double pole switches of any relay following the first relay opens the series circuit through the heat motor 34a, the contact arm of switch 36d, the normally closed contact arm of switch 36d, the contact arm of switch 38d, the normally closed contact of switch 38d, and the thermostatic switch 42, which are all connected in the above named order; and this operation also completes another circuit through the heat motor 34a and one of the contact arms and normally open contacts of switches 36d and 38d bypassing the thermostatic switch 42. The relay 60 of FIG. 4 and any other additional cascaded relays between the second and last relays could be provided with similar double pole switches connected in the series.

In the modification of FIG. 5, the jumper between terminals R and W2 of the thermostatic terminal block is removed and the opposite sides of contacts 70a of a second state thermostatic switch 70 are connected to the respective terminals R and W2. With contacts 70a open, only relays 34 and 36 are operated as previously described and relay 38 of FIG. 1 or relays 60 and 62 of FIG. 4 are prevented from operating or are de-energized. When contacts 70a are closed, operation of all relays are as described above.

Since many modifications, variations and changes in detail can be made to the present embodiments, it is intended that all the subject matter in the above description and accompanying drawings be interpreted in an illustrative rather than a limiting sense.

What is claimed is:

1. A circuit for a heating system comprising
a plurality of electric heating elements;
means including a motor for circulating fluid to be heated;
a plurality of at least three relays each having a heat motor and at least a first and a second switch each of which is closeable by energizing the respective heat motor for at least a predetermined time duration;
the first switch of a first relay of the plurality of relays controlling the motor of the fluid circulating means;
the first switch of each of the relays following the first relay controlling the respective heating elements;
the second switch of each relay, except a last relay of the plurality of relays, controlling the energization of the heat motor of the next relay;
a third switch of a second relay of the plurality of relays, the third switch being a double-pole switch and being connected so that in one position it connects the heat motor of the first relay to the second switch of the last relay and in the other position it energizes the heat motor of the first delay;
a thermostatic switch connected in a first series circuit with the heat motor of the first relay through the second switch of the last relay and the third switch of the second relay to energize the first relay to commence heating of the heating elements and in a second series circuit with the heat motor of the second relay and the second switch of the first relay to deenergize the second relay to commence de-energizing of the heating elements; and
the second switch of the last relay being a double pole switch and connected in one position in the first series circuit between the third switch of the second relay and the thermostatic switch and connected in the other position in a by-pass series circuit with the heat motor of the first relay to by-pass the thermostatic switch to maintain the first relay energized when the last relay is energized.

2. A circuit for a heating system as claimed in claim 1 wherein
there are power lines to supply power to the heating system,
there is a transformer having a secondary winding and a primary winding connected across said power lines,
said heating elements are connected in series with their respective switches across said power lines,
said second switches energize the heat motors of said next relays by connecting them across the secondary of the transformer, and
the first and second series circuits with the heat motor of said first relay are connected across the secondary of the transformer.

3. A circuit for a heating system as claimed in claim 1 wherein each of said heat motors includes
a pair of elongated bimetal elements each secured at one end and free at its other end, each bimetal element having a transverse curvature so as to be snap-acting at a predetermined temperature,
a heater wire to heat both of said pair of bimetal elements simultaneously, and
a pair of actuators in contact with the free end of each bimetal element to transmit the movement of said bimetal elements to the respective first and second switches of each relay.

4. A circuit for a heating system comprising
a plurality of electric heating elements;
means including a motor for circulating fluid to be heated;
a plurality of relays including at least a first relay, a second relay, and a last relay, each relay having at least first and second switches and a heat motor for operating the first and second switches after a predetermined duration of energization of the heat motor,
said first switch of the first relay controlling said motor of the circulating means;
said first switches of the plurality of relays following the first relay controlling respective heating elements of the plurality elements;
said second switch of each of the plurality of relays, except the last relay, being normally open and connected in series with the heat motor of the next relay;
said second switch of the last relay including a normally closed contact, a normally open contact and a common contact for engaging the normally closed contact when the last relay is unoperated and for engaging the normally open contact when the last relay is operated;
said second relay having a third switch which includes a normally closed contact, a normally open contact, and a common contact for engaging the normally closed contact when the second relay is unoperated and for engaging the normally open contact when the second relay is operated;
a thermostatic switch connnected in series with the normally closed contact and the common contact of the second switch of said last relay, the normally closed contact and the common contact of the third switch of the second relay, and the heat motor of the first relay to energize the first relay to initiate sequential energization of the motor of the fluid circulating means and the heating elements;
circuit connection means from the thermostatic switch in series with the heat motor of the second relay and the normally open second switch of the first relay to energize the second relay when the second switch of the first relay closes and to initiate de-energization of the plurality of relays when the thermostatic switch opens; and circuit connection means in series with the normally open contact and the common contact of the second switch of the last relay, the normally closed contact and the common contact of the third switch of the second relay, and the heat motor of the first relay to maintain the first relay energized when the second switch of the last relay is operated, said normally open contact of the third switch of the second relay connected to the normally open contact of the second switch of the last relay.

5. A circuit as claimed in claim 4 including a second stage thermostatic switch connected in series with the heat motor of the last relay.

6. A circuit for a heating system comprising first, second, third, fourth, fifth and sixth heating elements;

a blower motor;

power lines adapted to be connected to a source of power;

a transformer having a primary winding and a secondary winding, the primary being connected across said power lines;

first, second, third and fourth relays each having a heat motor and first and second single pole, single throw, power switches which are sequentially closeable by energizing the respective heat motor for at least predetermined first and second durations;

said first power switch on each of said relays and said second power switch on said first and said fourth relays being connected in respective series circuits with the respective first, second, third, fourth, fifth, and sixth heating elements, each series circuit connected across the power lines so that said power switches control the power to the heating elements;

said blower motor being connected in parallel with said first heating element connected in series with said first power of the first relay so that said first power switch of the first relay also controls the blower motor;

said first, second, and fourth relays each having a control switch actuated by the respective heat motors, the control switch on the first relay being single throw, single pole, the control switch on the second and fourth relays being single pole, double throw, and having a contact arm, a normally closed contact, and a normally open contact;

a thermostatic switch;

said thermostatic switch connected in a series circuit with the normally closed contact of the control switch of the fourth relay, the contact arm of the control switch of the fourth relay, the normally closed contact of control switch of the second relay, the contact arm of the control switch of the second relay, and the heat motor of the first relay, in the named order, between first and second ends of the secondary winding of the transformer, the first end of the secondary winding joined to one side of the thermostatic switch;

said control switch of the first relay connected in series with the heat motor of the second relay and with the thermostatic switch, in the named order, between the second and first ends of the secondary winding of the transformer;

said second power switch on the second and third relays being connected in series with the respective heat motors of the third and fourth relays across the secondary winding of the transformer to control the operation of the third and fourth relays; and said normally open contacts of the control switches of the third and fourth relays being connected to the first end of the secondary winding.

7. A circuit claimed in claim 6 including a second stage thermostatic switch connected in series with the heat motor of the third relay.

* * * * *